(12) United States Patent
Hall

(10) Patent No.: US 8,175,192 B2
(45) Date of Patent: May 8, 2012

(54) METHOD AND SYSTEM FOR DETERMINING AND REMOVING DC OFFSET IN COMMUNICATION SIGNALS

(75) Inventor: Steven D. Hall, Olivenhain, CA (US)

(73) Assignee: Broadcom Corporation, Irvine, CA (US)

( * ) Notice: Subject to any disclaimer, the term of this patent is extended or adjusted under 35 U.S.C. 154(b) by 855 days.

(21) Appl. No.: 11/732,339

(22) Filed: Apr. 2, 2007

(65) Prior Publication Data
US 2008/0240294 A1 Oct. 2, 2008

(51) Int. Cl.
H04L 25/06 (2006.01)
H04L 27/00 (2006.01)

(52) U.S. Cl. .................. 375/319; 375/316
(58) Field of Classification Search .......... 375/319, 375/317, 316
See application file for complete search history.

(56) References Cited

U.S. PATENT DOCUMENTS

2003/0030582 A1* 2/2003 Vickers ............... 342/54
2004/0105508 A1* 6/2004 Kim et al. ............ 375/286
2005/0157815 A1* 7/2005 Kim et al. ............ 375/302
2007/0086548 A1* 4/2007 Rawlins et al. ....... 375/346
2007/0291883 A1* 12/2007 Welz et al. ........... 375/350

* cited by examiner

Primary Examiner — Kevin M Burd
Assistant Examiner — Brian J Stevens
(74) Attorney, Agent, or Firm — Farjami & Farjami LLP

(57) ABSTRACT

According to one exemplary embodiment, a method and system for determining and removing DC offset in an AC signal includes receiving an AC signal having a first-channel and a second-channel, e.g. an I-channel and a Q-channel, receiving a plurality of first-channel and second-channel samples, storing a negative first-channel sample corresponding to a first sign change in the plurality of second-channel samples, and storing a positive first-channel sample corresponding to a second sign change in the plurality of second-channel samples. The method further includes determining an average value of the negative first-channel sample and the positive first-channel sample, where the average value is the DC offset in the first-channel. The method can further include subtracting the determined DC offset from samples received in the first-channel (or the second-channel) prior to demodulation. The method and system can be implemented in, for example, a Bluetooth receiver.

20 Claims, 5 Drawing Sheets

METHOD AND SYSTEM FOR DETERMINING AND REMOVING DC OFFSET IN COMMUNICATION SIGNALS

BACKGROUND OF THE INVENTION

1. Field of the Invention

The present invention is generally in the field of electronic circuits and systems. More specifically, the present invention is in the field of electronic communication circuits and systems.

2. Background Art

Wireless receivers, such as those used in Bluetooth, cellular, or WiFi systems, for example, using phase-shift keying (PSK) or frequency-shift keying (FSK), as well as other types of modulation can suffer from degraded demodulation performance and diminished signal reception when DC offset is present or generated in the receiver. Direct conversion receivers are particularly sensitive to DC offset, since a received signal is directly converted down to baseband where the DC offset is imposed.

If the DC offset in a signal can be accurately estimated, then the DC offset can be subtracted to improve performance and signal reception in the receiver. One conventional approach for estimating DC offset in a receiver takes the long term average of the incoming signal and uses that as the DC offset estimate. However, this estimate can be biased by the data content of the incoming signal. If the incoming signal has numerous togglings between zero and one data bits, for example, then the DC offset estimate will be weighted towards such data content, which can be an inaccurate estimate of the DC offset and degrade performance. In another conventional approach, DC offset in a Bluetooth device is estimated by analyzing the preamble of a Bluetooth packet, which contains only a fixed zero-one pattern of four symbols. One problem with this approach is that the preamble comes so early in the Bluetooth packet that the receiver's automatic gain control (AGC) is unlikely to be settled, so subsequent changes to the AGC will impact the DC offset.

Thus there is a need in the art for a method of effectively determining DC offset in AC signals, for example, those received in wireless systems, without the shortcomings of the conventional methods.

SUMMARY OF THE INVENTION

Method and system for determining and removing DC offset in communication signals, substantially as shown in and/or described in connection with at least one of the figures, and as set forth more completely in the claims.

DETAILED DESCRIPTION OF THE INVENTION

The present invention is directed to method and system for determining and removing DC offset in communication signals. Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely exemplary embodiments of the invention. To maintain brevity, other embodiments of the invention which use the principles of the present invention are not specifically described in the present application and are not specifically illustrated by the present drawings.

Figure 1:
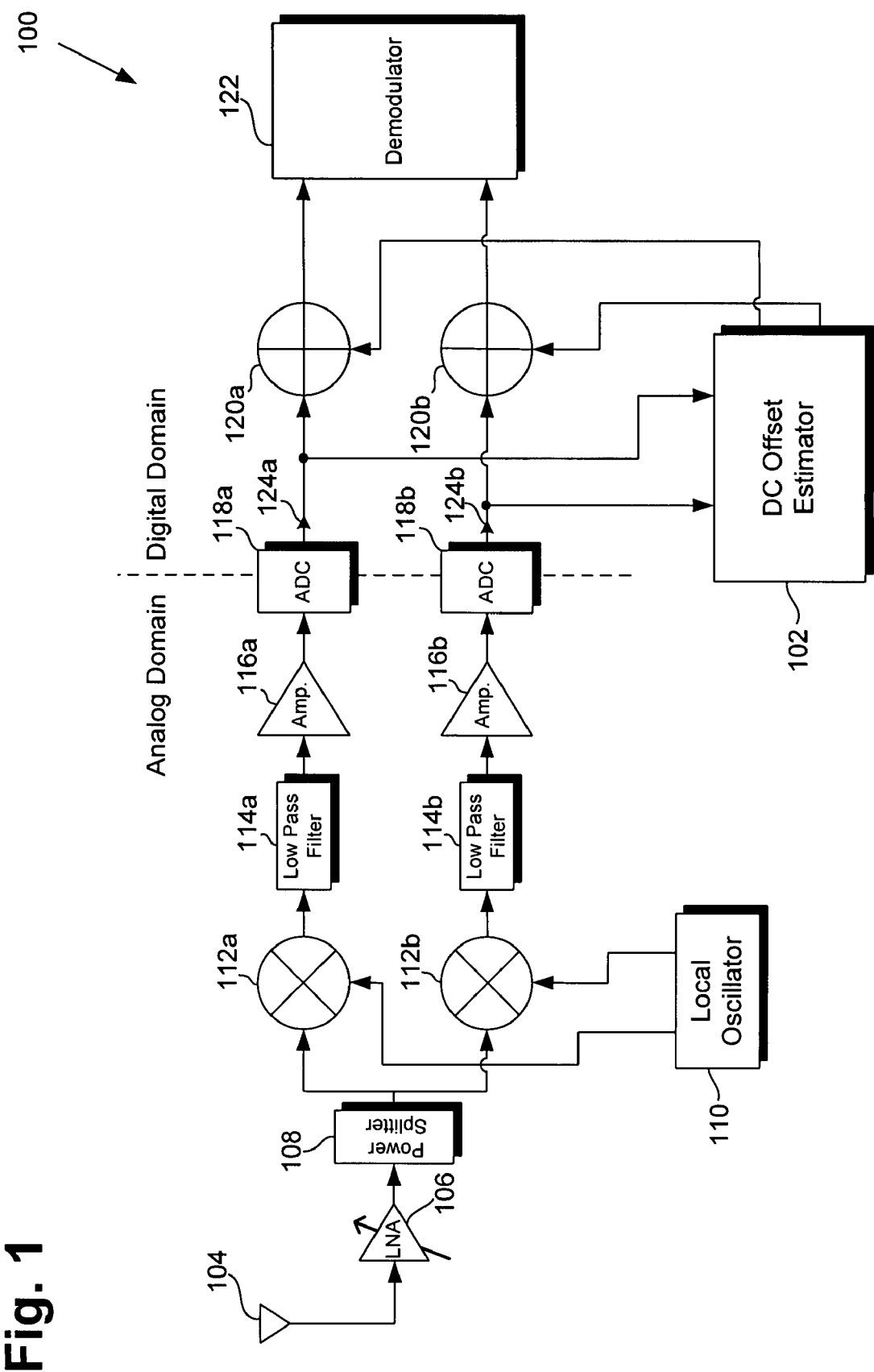
FIG. 1 shows a wireless receiver system implementing an embodiment of the invention's method for determining and removing DC offset.

FIG. 1 illustrates a diagram of exemplary wireless receiver system 100 including DC offset estimator 102 implementing an embodiment of the invention's method of determining DC offset in received AC signals, such as received wireless AC signals. Wireless receiver system 100 can be a Bluetooth system (also referred to as a "Bluetooth receiver" in the present application), a cellular system, a wireless fidelity (WiFi) system, or another type of wireless communications system, for example. As shown in FIG. 1, wireless receiver system 100 further includes antenna 104, low noise amplifier 106, power splitter 108, local oscillator 110, mixers 112a and 112b, low pass filters 114a and 114b, amplifiers 116a and 116b, analog to digital converters 118a and 118b, adders 120a and 120b, and demodulator 122. By way of background, DC offset can be caused in a variety of ways within wireless receiver system 100 and, if not properly determined and removed, can result in, for example, decreased demodulation performance and diminished reception within wireless receiver system 100. DC offset can arrive, for example, as a local oscillator feed-through from a transmitter (not shown in FIG. 1) in wireless system 100.

As shown in FIG. 1, an AC signal is received in the analog domain by wireless receiver system 100 at antenna 104. Low noise amplifier 106 is situated close to antenna 104 and ideally amplifies the AC signal received by antenna 104 while adding minimal noise or distortion to the AC signal. The AC signal passes through power splitter 108 and is mixed with signals generated by local oscillator 10 to generate an in-phase component of the AC signal at the output of mixer 112a, and a quadrature-phase component of the AC signal at the output of mixer 112b. As an example, DC offset can be caused in wireless receiver system 100 if local oscillator 110 generates some spurious output that couples into low noise amplifier 106 or into mixers 112a and 112b.

The in-phase and quadrature phase components of the AC signal pass through low pass filters 114a and 114b and are magnified by amplifiers 116a and 116b, respectively, before being delivered to analog to digital converters 118a and 118b. As another example, DC offset can also be generated by low pass filters 114a and 114b, amplifiers 116a and 116b, and analog to digital converters 118a and 118b. Analog to digital converters 118a and 118b convert the analog signals to digital signals, and output digital in-phase and quadrature-phase samples, i.e. I-channel samples 124a and Q-channel samples 124b, respectively. The undesirable DC offset generated in the analog domain of wireless receiver system 100 will be transferred to the digital domain.

Once in the digital domain, I-channel samples 124a and Q-channel samples 124b are delivered to DC offset estimator 102, which implements an embodiment of the invention's method, described in more detail below and in reference to flowchart 300 of FIG. 3, to determine the DC offset in I-channel samples 124a and Q-channel samples 124b. In one embodiment, DC offset estimator 102 can be a digital signal processor (DSP). In other embodiments, DC offset estimator 102 can be implemented using firmware, software, a combination of hardware and software, or other hardware separate from or included in wireless receiver system 100.

The DC offset determined by DC offset estimator 102 can be subtracted from I-channel samples 124a and Q-channel samples 124b at adders 120a and 120b, respectively, before demodulation at demodulator 122. Since many modulation techniques involving a "constant envelope" modulation, such as Gaussian Frequency Shift Keying (GFSK), Frequency-Shift Keying (FSK) and Gaussian Minimum Shift Keying (GMSK), are sensitive to DC offset in addition to other modulation techniques, such as Phase-Shift Keying (PSK), DQPSK, 8DPSK, and QPSK, for example, are very sensitive to DC offset, it is desirable to accurately determine and remove any DC offset from I-channel samples 124a and Q-channel samples 124b before demodulation.

Figure 2:
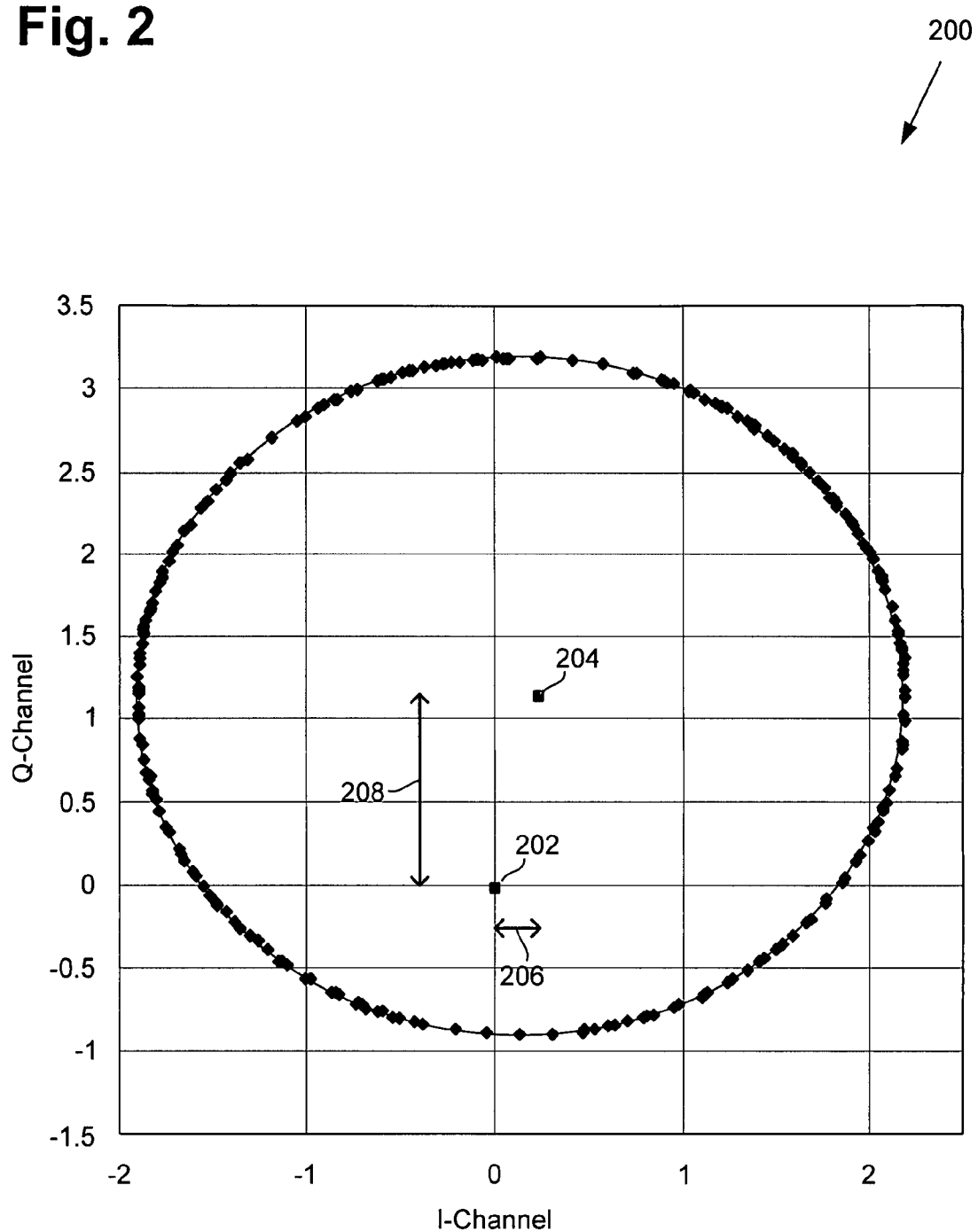
FIG. 2 is a constellation diagram of exemplary received AC signals with DC offset.

An example of the DC offset described above in I-channel samples 124a and Q-channel samples 124b can be illustrated by reference to FIG. 2, which shows constellation diagram 200, a two-dimensional scatter diagram having I-channel and Q-channel sampling points for a "constant envelope" signal using a GFSK modulation technique, for example (the invention is, however, not limited to use with GFSK modulation technique which is used solely as an example). As shown in FIG. 2, constellation diagram 200 is not centered at origin 202. Rather, DC offset in the I-channel and Q-channel shifts the signal constellation so that it is centered at center 204. The DC offset illustrated in FIG. 2 has an I-channel offset 206 component and a Q-channel offset 208 component. This DC offset shift is undesirable and can result in, for example, degraded demodulation performance. It is an object of the present invention to accurately determine, and thus be able to eliminate, I-channel offset 206 and Q-channel offset 208, the DC offset in the I-channel and Q-channel samples.

A signal having a constellation diagram as shown in FIG. 2 will have a magnitude "C" expressed by the equation:

$$C = \sqrt{x^2 + y^2} \quad \text{equation (1)}$$

Where x is the I-channel signal magnitude and y is the Q-channel signal magnitude. When there is a DC offset "A" on the I-channel and a DC offset "B" on the Q-channel, the equation can be expressed as:

$$C^2 = (x-A)^2 + (y-B)^2 \quad \text{equation (2)}$$

Solving individually for the DC offset "A" on the I-channel by setting y=0 and solving for x using the quadratic equation, the equation can be expressed as:

$$x = \frac{2 \times A \pm \sqrt{4 \times A^2 - 4 \times (A^2 + B^2 - C^2)}}{2} \quad \text{equation (3)}$$

$$x_{neg} = A - \sqrt{C^2 - B^2}$$

$$x_{pos} = A + \sqrt{C^2 - B^2}$$

Averaging the negative and positive solutions for x yields the DC offset "A" in the I-channel, which is expressed by the equation:

$$\frac{x_{neg} + x_{pos}}{2} = \frac{A - \sqrt{C^2 - B^2} + A + \sqrt{C^2 - B^2}}{2} = A \quad \text{equation (4)}$$

Therefore, solving for the negative and positive solutions for x in equation (4) will yield the I-channel offset 206 component shown in FIG. 2. Similarly, solving for the negative and positive solutions for y will yield the Q-channel offset 208 component shown in FIG. 2.

Figure 3:
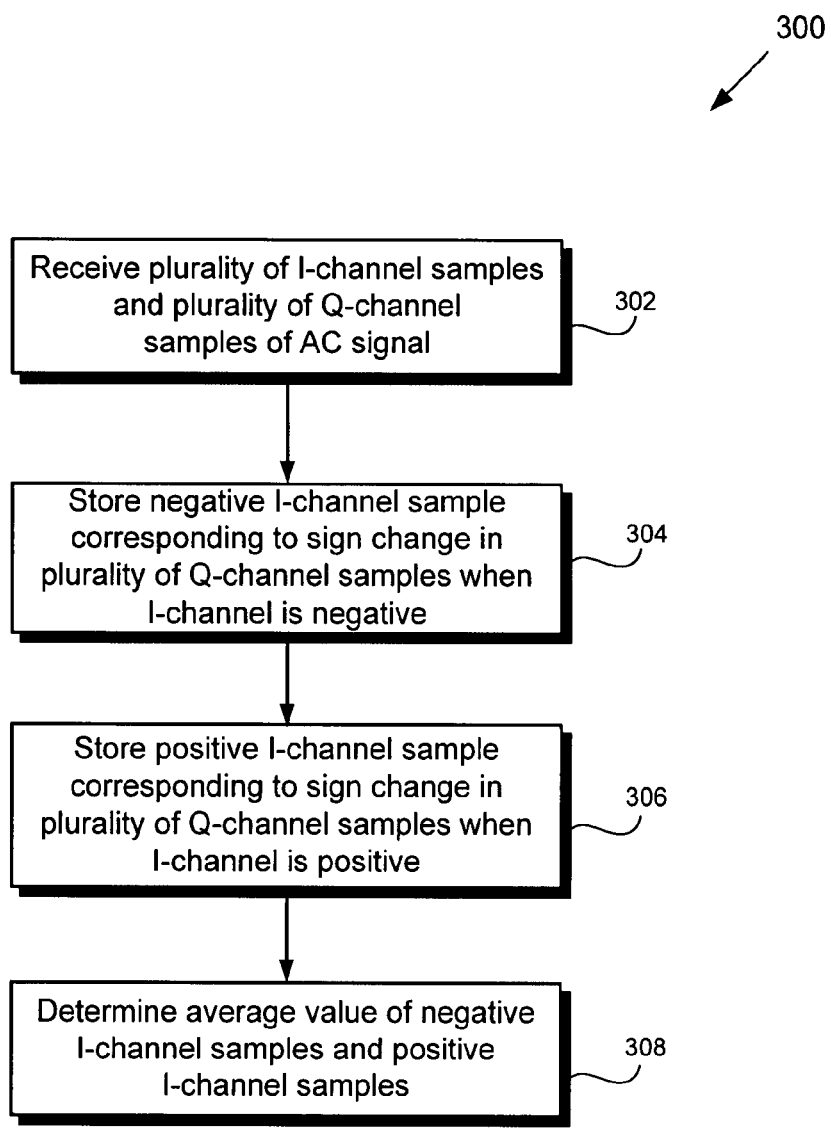
FIG. 3 is a flowchart illustrating steps taken to implement one embodiment of the present invention.

FIG. 3 shows flowchart 300 illustrating an exemplary method according to one embodiment of the present invention. Certain details and features have been left out of flowchart 300 that are apparent to a person of ordinary skill in the art. For example, a step may consist of one or more substeps or may involve specialized equipment or materials, as known in the art. Flowchart 300 illustrates the invention's exemplary method of receiving an AC signal having I-channels (i.e., an in-phase component) and Q-channels (i.e., a quadrature-phase component) and determining a DC offset in the I-channel. Although flowchart 300 specifically describes determining a DC offset in the I-channel, the same method can be applied to determine a DC offset in the Q-channel. As such, the exemplary method of the present invention can determine DC offset in both the in-phase and quadrature-phase components of an AC signal. In one embodiment, the method of flowchart 300 is implemented in a wireless receiver system, such as in DC offset estimator 102 within wireless receiver system 100, described above and shown in FIG. 1.

At step 302 of flowchart 300, a plurality of digital I-channel and Q-channel samples are received from an AC signal having an I-channel and a Q-channel. Digital I-channel and Q-channel samples, e.g. I-channel samples 124a and Q-channel samples 124b in FIG. 1, can be received by a digital signal processor, e.g. a digital signal processor including or implementing DC offset estimator 102 in FIG. 1, from analog to digital converters, e.g. analog to digital converters 118a and 118b in FIG. 1. Preferably, the sampling rate for I-channel and Q-channel samples is a high rate relative to the data rate to ensure accurate determination of the DC offset. For example, in a Bluetooth receiver, where the data rate can be approximately 1 Mbps, an adequate sampling rate can be eight mega samples per second.

At steps 304 and 306 of flowchart 300, a negative I-channel sample is stored corresponding to a sign change in the plurality of Q-channel samples when the I-channel sample is negative, and a positive I-channel sample is stored corresponding to a sign change in the plurality of Q-channel samples when the I-channel signal is positive. For example, if a first Q-channel sample is positive or zero and the next Q-channel sample is negative or zero, a sign change, i.e. a zero crossing, on the Q-channel has been detected, and the I-channel sample corresponding to the sign of the I-channel samples is stored. Similarly, if a first Q-channel sample is negative or zero and the next Q-channel sample is positive or zero, a sign change, i.e. a zero crossing, on the Q-channel has been detected, and the I-channel sample corresponding to the sign of the I-channel samples is stored. Sign changes in the plurality of Q-channel samples will be detected at steps 304 and 306 until both negative and positive I-channel samples have been stored. Similarly, negative and positive Q-channel samples corresponding to I-channel zero crossings can be stored to determine DC offset in the Q-channel.

Figure 4:
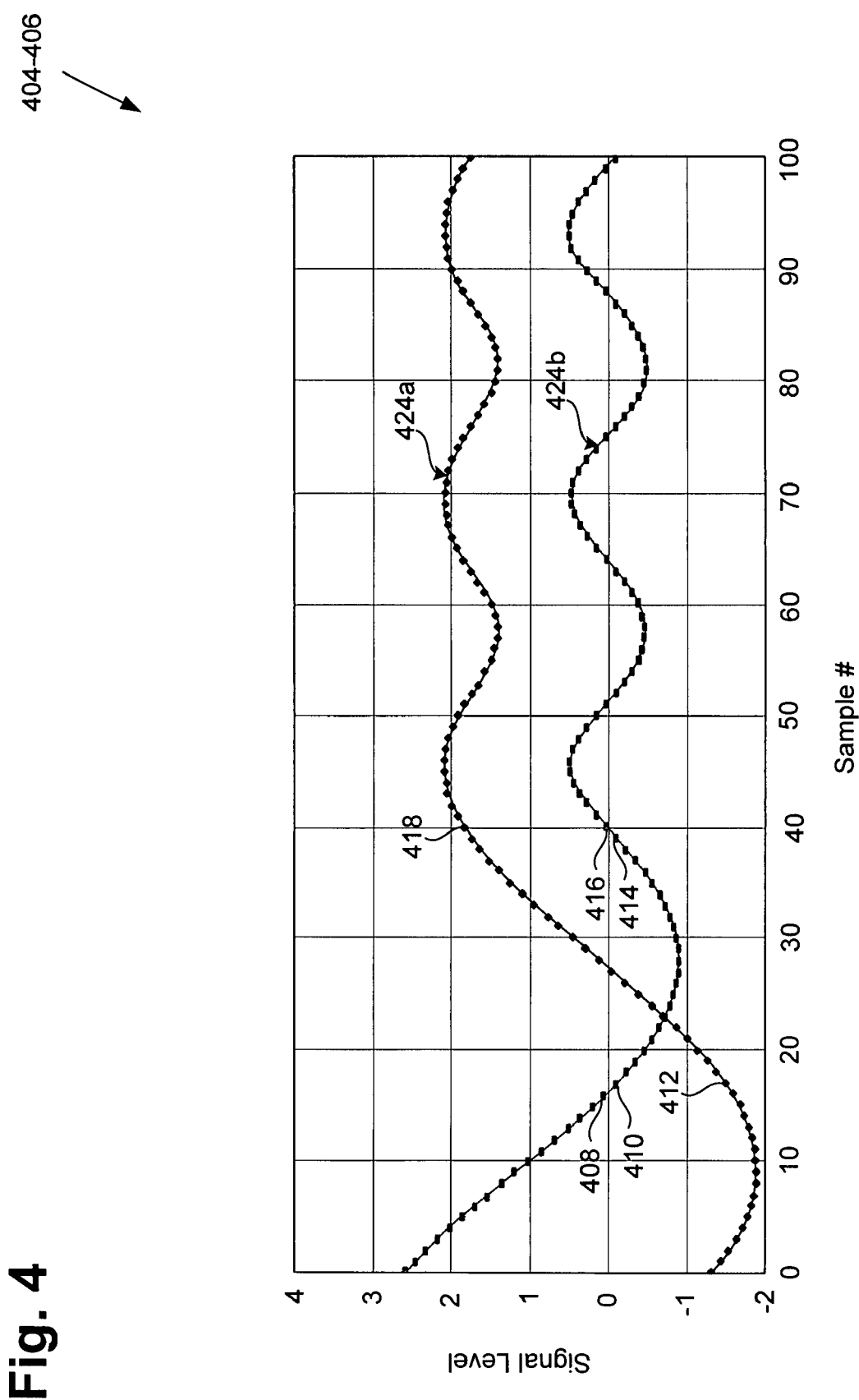
FIG. 4 shows a number of I-channel and Q-channel samples to aid in illustration of one embodiment of the invention.

Steps 304 and 306 of flowchart 300 can be illustrated by plot 404-406 of FIG. 4, which includes I-channel 424a and Q-channel 424b comprising a plurality of I-channel and Q-channel samples, respectively (corresponding to I-channel samples 124a and Q-channel samples 124b in FIG. 1). As shown in FIG. 4, Q-sample 408 is positive and is followed immediately by Q-sample 410, which is negative. Since consecutive Q-samples changed sign, a zero crossing has been detected and I-sample 412 is stored, which is negative and corresponds to Q-sample 410. Thus, a negative I-channel sample, I-sample 412, is stored corresponding to the first sign change in the plurality of Q-channel samples. As also shown in FIG. 4, Q-sample 414 is negative and is followed immediately by Q-sample 416, which is positive. Since consecutive Q-samples changed sign, a zero crossing has been detected and I-sample 418 is stored, which is positive and corresponds to Q-sample 416. Thus, a positive I-channel sample, I-sample 418, is stored corresponding to the second sign change in the plurality of Q-channel samples. The order in which the negative and positive I-channel samples are stored can be different, and is dependent on the signal. For example, a signal having an I-channel and a Q-channel might produce several positive I-channel samples corresponding to Q-channel zero crossings before producing a negative I-channel sample. In this situation, steps 304 and 306 of flowchart 300 are repeated until at least one, but preferably more, negative I-channel sample and one positive I-channel sample have been stored.

At step 308 of flowchart 300, an average value of the stored negative and positive I-channel samples is determined, which is the DC offset in the I-channel. In a wireless receiver system, such as wireless receiver system 100 of FIG. 1, removing the DC offset from the I-channel prior to demodulation significantly improves demodulation performance. Therefore, the exemplary method described in steps 302 through 308 of flowchart 300 describes a method for obtaining the data necessary to solve for the negative and positive solutions for x in equation (4), described above, which provides for an accurate determination of the DC offset in the I-channel. Similarly, the same method can be used so determine the DC offset in the Q-channel.

The DC offset present in I-channel samples 124a is thus determined and outputted by DC offset estimator 102 to adder 120a, which subtracts such DC offset from the I-channel to provide, for example improved signal quality and accuracy, to demodulator 122. Likewise, an average value of the stored negative and positive Q-channel samples can be determined in a similar manner, which is the DC offset in the Q-channel. The DC offset present in Q-channel samples 124b is thus determined and outputted by DC offset estimator 102 to adder 120b, which subtracts such DC offset from the Q-channel to provide, for example improved signal quality and accuracy, to demodulator 122.

In the embodiment described above in steps 302 through 308 of flowchart 300, at least one negative I-channel sample and one positive I-channel sample are stored before determining DC offset in the I-channel. However, in other embodiments where noise is present in the I-channel and Q-channel samples, DC offset in the I-channel can be determined based on multiple negative and positive I-channel samples. For example, an 1o average value of the stored negative and positive I-channel samples may not be determined in step 308 of flowchart 300 until eight negative and eight positive I-channel samples have been stored in steps 304 and 306 of flowchart 300. Additionally, the DC offset in the I-channel can be determined based on unequal quantities of negative and positive I-channel samples such as, for example, eight negative and four positive I-channel samples, with proper weight being accorded to the negative and positive samples in light of their unequal quantities. Storing multiple negative and positive I-channel samples corresponding to zero crossings on the Q-channel and averaging the stored I-channel samples can advantageously average out any noise present in the I-channel and Q-channel signals. In another embodiment, an initial DC offset estimate can be updated as more I-channel and Q-channel samples meet the zero crossing criteria and are averaged into the DC offset estimate.

Figure 5:
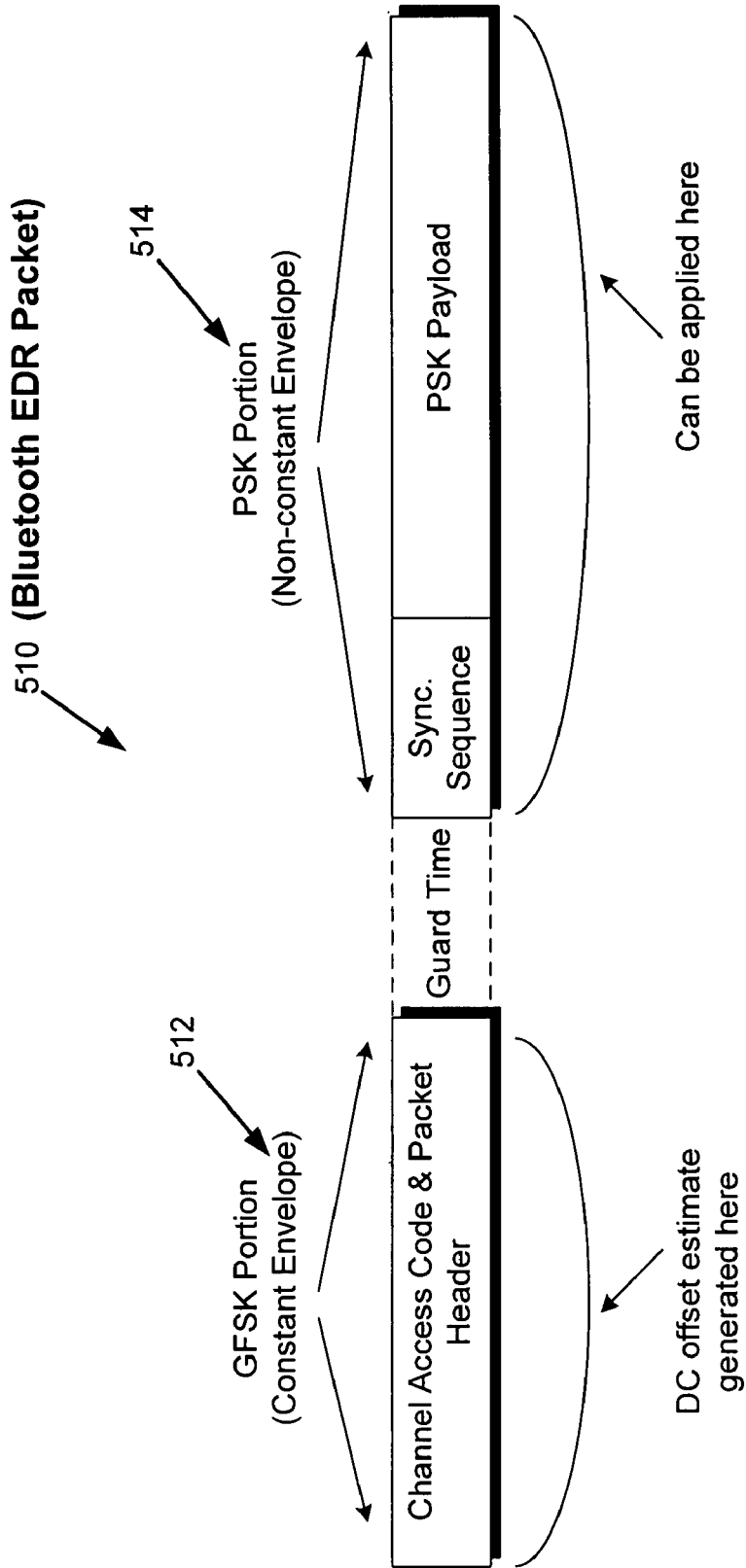
FIG. 5 shows an exemplary Bluetooth Enhanced Data Rate (EDR) packet to which an embodiment of the invention can be applied.

The invention as described applies to constant envelope modulated signals. It can however be used for PSK signals if there is a constant envelope signal upon which to make a DC offset estimate. Bluetooth Enhanced Data Rate (EDR) packet 510, for example, shown in FIG. 5 has constant envelope portion 512 in packet 510 that can be used for estimating DC offset. That estimate can be applied to the entire packet, including PSK portion 514.

Thus, the present invention provides a method for advantageously determining a DC offset in an AC signal having in-phase and quadrature-phase components. It is noted that the invention's method, as described above, results, among other things, in an accurate determination of DC offset in both an ideal and noisy signal, thereby facilitating removal of DC offset for improved signal performance.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. For example, although an embodiment of the invention has been described in relation to signals characterized or defined in terms of an I-channel (i.e., an in-phase component) and a Q-channel (i.e., a quadrature-phase component), the principles of the invention can be applied to signals defined in terms of channels other than I and Q channels, and/or channels that are not necessarily out of phase by 90°. The described embodiments are to be considered in all respects as illustrative and not restrictive. It should also be understood that the invention is not limited to the particular embodiments described herein, but is capable of many rearrangements, modifications, and substitutions without departing from the scope of the invention.

Thus, method and system for determining and removing DC offset in communication signals have been described.

The invention claimed is:

1. A method for use by a communications receiver for receiving an AC signal having a first-channel and a second-channel and determining a DC offset in said first-channel, said method comprising:

receiving a plurality of first-channel samples and a plurality of second-channel samples by said communications receiver;

detecting a first sign change in said plurality of second-channel samples;

storing a negative first-channel sample selected from said plurality of first-channel samples in response to said detecting said first sign change, said negative first-channel sample corresponding to said first sign change in said plurality of second-channel samples;

detecting a second sign change in said plurality of second-channel samples;

storing a positive first-channel sample selected from said plurality of first-channel samples in response to said detecting said second sign change, said positive first-channel sample corresponding to said second sign change in said plurality of second-channel samples;

determining an average value of said negative first-channel sample and said positive first-channel sample, said average value being said DC offset in said first-channel.

2. The method of claim 1 wherein said first-channel is an I-channel and said plurality of first-channel samples are a plurality of I-channel samples, wherein said second-channel is a Q-channel and said plurality of second-channel samples are a plurality of Q-channel samples.

3. The method of claim 1 wherein said first-channel is a Q-channel and said plurality of first-channel samples are a plurality of Q-channel samples, wherein said second-channel is an I-channel and said plurality of second-channel samples are a plurality of I-channel samples.

4. The method of claim 1 wherein said step of storing a negative first-channel sample corresponding to a first sign change in said plurality of second-channel samples is repeated until a specified quantity of negative first-channel samples have been stored.

5. The method of claim 1 wherein said step of storing a positive first-channel sample corresponding to a first sign change in said plurality of second-channel samples is repeated until a specified quantity of positive first-channel samples have been stored.

6. The method of claim 1 wherein said AC signal is a modulated signal.

7. The method of claim 1, wherein said AC signal is a modulated signal modulated using a modulation technique selected from the group consisting of PSK, FSK, GFSK, DQPSK, 8DPSK, and QPSK.

8. The method of claim 1, wherein said communications receiver comprises a Bluetooth receiver.

9. The method of claim 1, wherein said AC signal is a modulated signal comprising a GFSK modulated signal, and wherein said communications receiver comprises a Bluetooth receiver.

10. The method of claim 1 further comprising removing said DC offset from said first-channel.

11. A system for receiving an AC signal having a first-channel and a second-channel and determining a DC offset in said first-channel, said system comprising:
 means for receiving a plurality of first-channel samples and a plurality of second-channel samples;
 means for detecting first and second sign changes in said plurality of second-channel samples;
 means for storing a negative first-channel sample selected from said plurality of first-channel samples in response to said detecting said first sign change, said negative first-channel sample corresponding to said first sign change in said plurality of second-channel samples;
 means for storing a positive first-channel sample selected from said plurality of first-channel samples in response to said detecting said second sign change, said positive first-channel sample corresponding to said second sign change in said plurality of second-channel samples;
 means for determining an average value of said negative first-channel sample and said positive first-channel sample, said average value being said DC offset in said first-channel.

12. The system of claim 11 wherein said first-channel is an I-channel and said plurality of first-channel samples are a plurality of I-channel samples, wherein said second-channel is a Q-channel and said plurality of second-channel samples are a plurality of Q-channel samples.

13. The system of claim 11 wherein said first-channel is a Q-channel and said plurality of first-channel samples are a plurality of Q-channel samples, wherein said second-channel is an I-channel and said plurality of second-channel samples are a plurality of I-channel samples.

14. The system of claim 11 wherein said AC signal is a modulated signal.

15. The system of claim 11, wherein said AC signal is a modulated signal modulated using a modulation scheme selected from the group consisting of PSK, FSK, GFSK, DQPSK, 8DPSK, and QPSK.

16. The system of claim 11 wherein said system is a Bluetooth receiver.

17. The system of claim 11, wherein said AC signal is a modulated signal received in a Bluetooth receiver, said modulated signal comprising a GFSK modulated signal.

18. The system of claim 11, wherein said system is a Bluetooth receiver, and wherein said AC signal is a modulated signal modulated using a modulation scheme selected from the group consisting of PSK, FSK, GFSK, DQPSK, 8DPSK, and QPSK.

19. The system of claim 11 wherein said DC offset is removed from said first-channel.

20. The system of claim 11 wherein said system includes a digital signal processor.

* * * * *